March 19, 1940. G. V. WOODLING 2,194,346
STABILIZER FOR VEHICLES
Filed May 14, 1935 4 Sheets-Sheet 1

INVENTOR
George V. Woodling

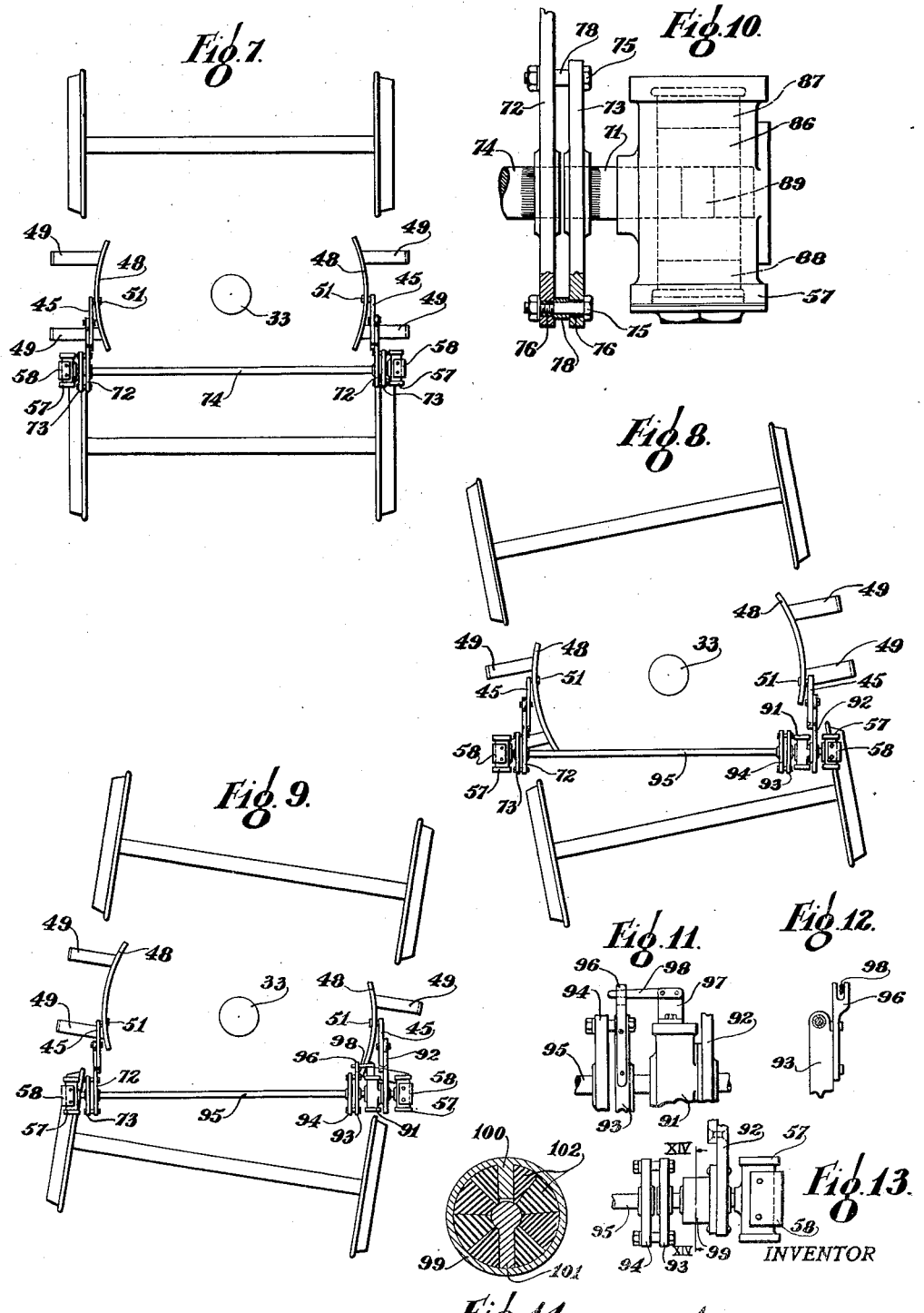

March 19, 1940.　　　G. V. WOODLING　　　2,194,346
STABILIZER FOR VEHICLES
Filed May 14, 1935　　　4 Sheets-Sheet 3
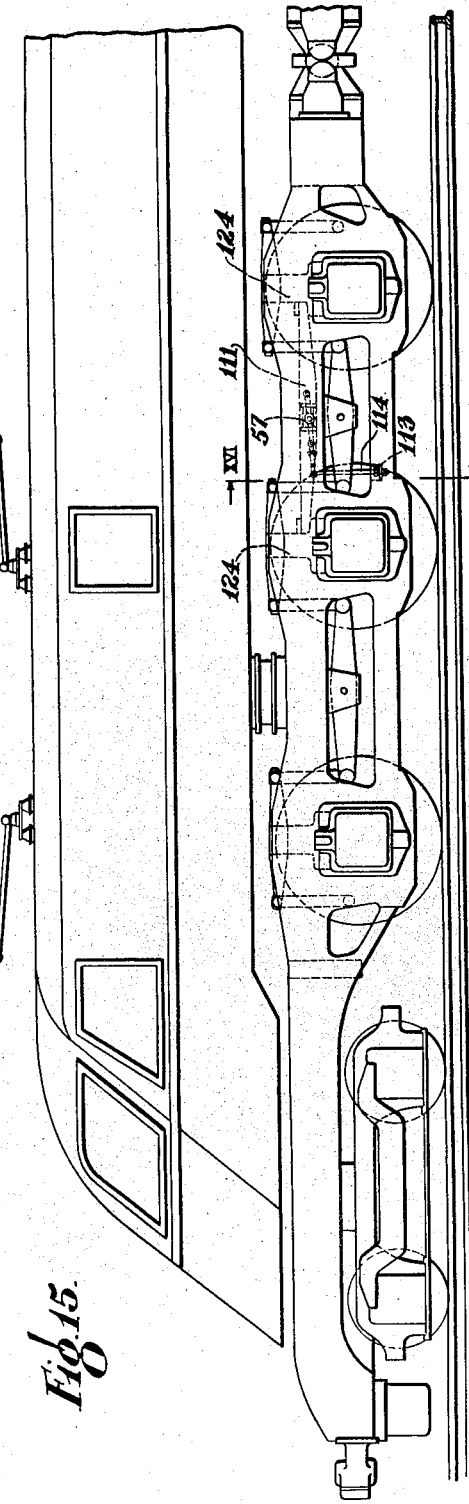
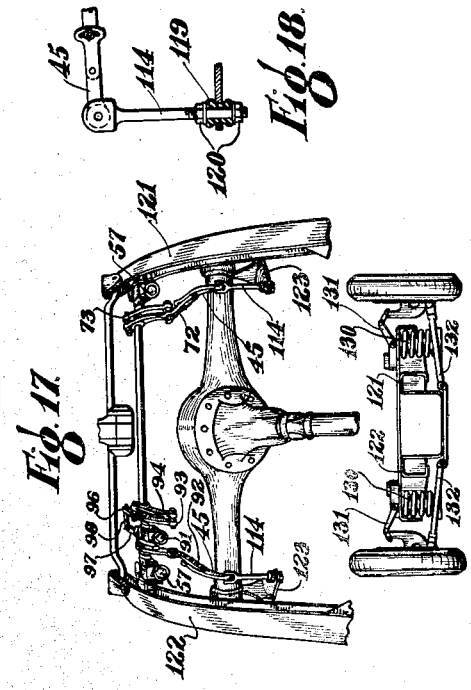
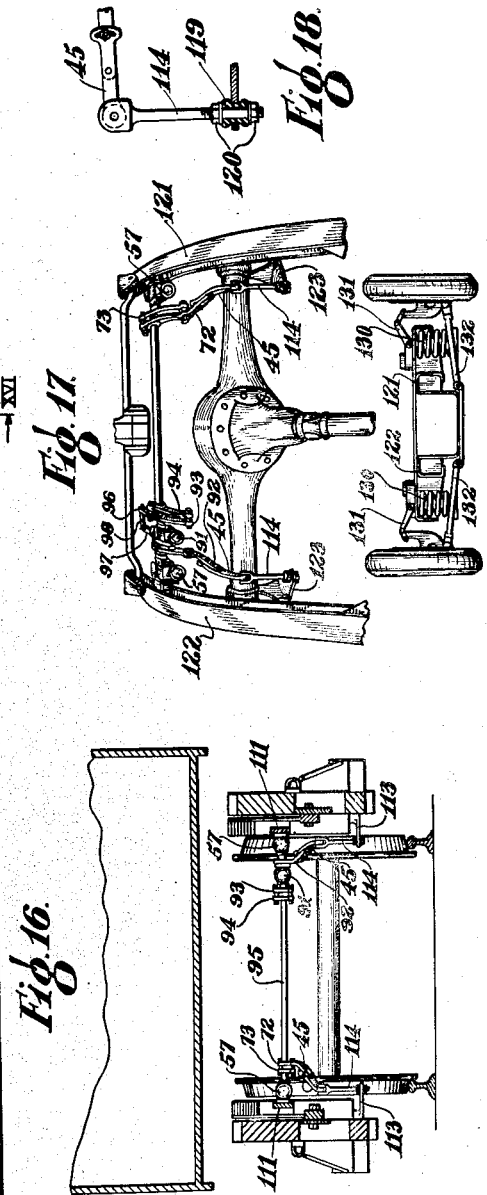
INVENTOR
George V. Woodling

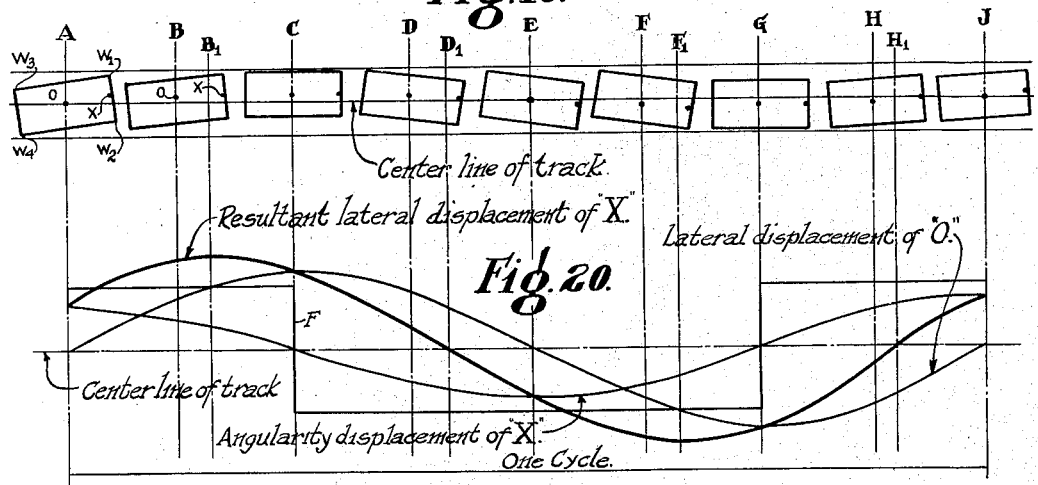
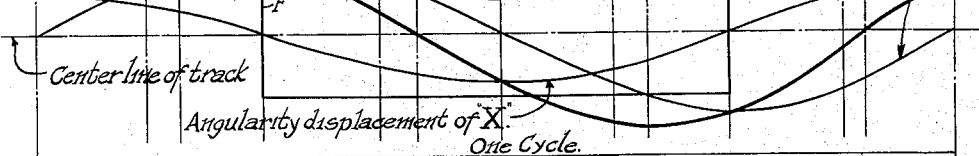
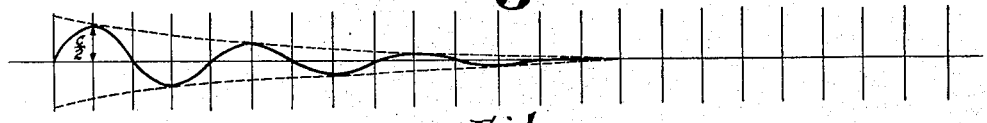
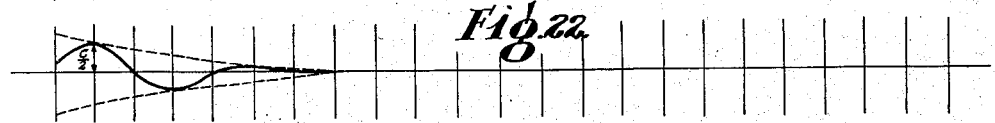
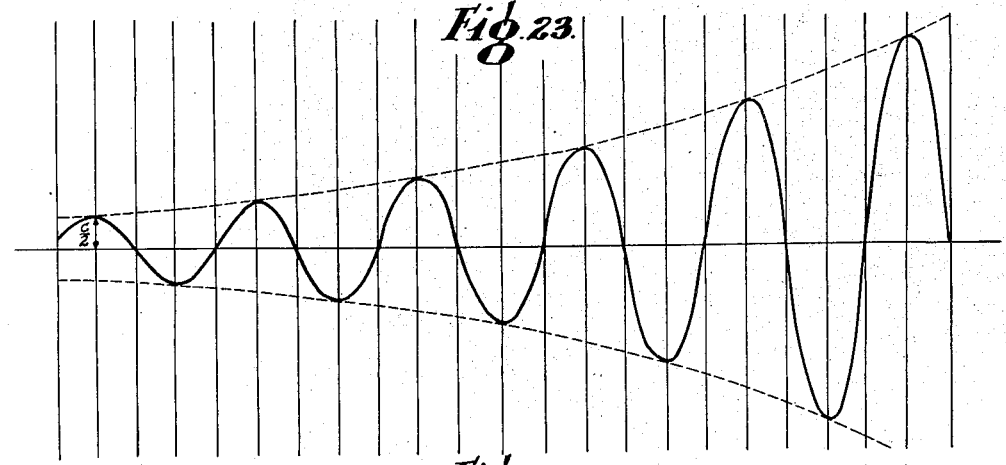
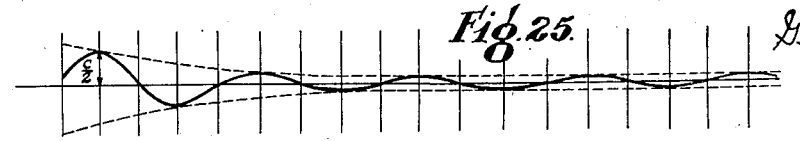

Patented Mar. 19, 1940

2,194,346

UNITED STATES PATENT OFFICE 2,194,346

STABILIZER FOR VEHICLES

George V. Woodling, Cleveland, Ohio

Application May 14, 1935, Serial No. 21,405

12 Claims. (Cl. 267—11)

My invention relates generally to vehicles and more particularly to means for improving the tracking characteristics of rail vehicles and the riding quality of automotive vehicles.

In the following description, my invention will be described in connection with a passenger or freight car, an electric locomotive, and an automobile, but it is to be understood that my invention applies to vehicles of all types. Also, for the purpose of clarity and simplicity, the vehicle may be considered as having two main parts; one the sprung mass and the other the unsprung mass. The sprung mass comprises that part of the vehicle which is supported by the springs, and the unsprung mass comprises the axle and wheels and any other parts that may be mounted thereon.

An object of my invention is the provision of a stabilizer mounted between the sprung and the unsprung masses to improve the operating characteristics of the vehicle.

A more specific object of my invention is to provide for arresting the "rolling" and the "nosing" actions of a rail vehicle.

Another object of my invention is the provision of a stabilizer which, when mounted between the sprung and the unsprung masses of a rail vehicle having a spring equalization system, allows the free vertical movements of the wheels.

A further object of my invention is to allow the free vertical movements of the sprung mass with respect to the unsprung mass, but, at the same time, prevent the "rolling" action.

It is also an object of my invention to reduce to a minimum the angle between the center line of a rail vehicle and the center line of the track, and thereby prevent the "nosing" action of the rail vehicle.

A still further object of my invention is to provide for giving in effect a three point suspension of the sprung mass upon the unsprung mass.

Another object of my invention is to provide for improving the riding quality of automotive vehicles.

A further object of my invention is the provision of a stabilizer that shall be reliable, free from wear, and efficient in operation, and shall be readily manufactured and installed.

Another object of my invention is to provide for dissipating that energy of the vehicle which tends to cause the sprung mass of the vehicle to "roll" relative to the unsprung mass, or in the case of a rail vehicle for dissipating that energy which sustains the lateral oscillations of the unsprung mass of the rail vehicle.

A further object of my invention is to provide for inter-connecting the two shock absorbers of a vehicle either by a third shock absorber, or by the combination of a third shock absorber and a resilient member for dissipating that energy which tends to cause the sprung mass of the vehicle to "roll" relative to the unsprung mass of the vehicle.

A still further object of my invention is to provide for mounting a device that absorbs energy between the sprung mass and the unsprung mass of a vehicle so that the energy absorbing device is responsive only to the "rolling" movements between the sprung mass and the unsprung mass of a vehicle.

It is also an object of my invention to provide for mounting a stabilizing member between the sprung mass and the unsprung mass of a vehicle wherein the mounting is such that the unsprung mass may assume various pivotal turning positions with respect to the sprung mass.

A still further object of my invention is the provision of adjustable stabilizing arms to accommodate the inequality of the springs that support the sprung mass upon the unsprung mass, thereby relieving the stabilizing member of any undue strain caused by the inequality of the supporting springs.

Other objects and a fuller understanding of my invention may be had by referring to the following description taken in connection with the accompanying drawings, in which:

Figure 7 represents a somewhat diagrammatic view of the manner in which a modified arrangement of my stabilizer is connected between the sprung mass and the unsprung mass of a vehicle wherein the unsprung mass may assume various pivotal turning positions with respect to the sprung mass;

Figure 8 represents a somewhat diagrammatic view of the manner in which a further modified arrangement of my stabilizer is connected between the sprung mass and the unsprung mass of a vehicle wherein the unsprung mass may assume various pivotal turning positions with respect to the sprung mass;

Figure 9 represents a somewhat diagrammatic view of the manner in which a still further modified arrangement of my stabilizer is connected between the sprung mass and the unsprung mass of a vehicle wherein the unsprung mass may assume various pivotal turning positions with respect to the sprung mass;

Figure 10 shows an enlarged and fragmentary view of the right hand side of the modified stabilizer arrangement shown in Figure 7;

Figure 11 is an enlarged and fragmentary view of the right hand side of the modified stabilizer arrangement shown in Figure 9;

Figure 12 is a side elevational view of Figure 11 showing only that part which resiliently interconnects the stabilizing member to the shock absorbers;

Figure 13 is a modified arrangement of the right hand side of the stabilizer shown in Figure 8 in that a rubber-cushioned coupling is utilized instead of the fluid shock absorber;

Figure 14 is a cross-sectional view of the rubber-cushioned coupling taken along the line XIIII—XIIII of Figure 13;

Figure 15 is a side elevational view of the front half of an electrical locomotive embodying the features of my invention;

Figure 16 is a cross-sectional and elevational view of an electric locomotive taken along the line XVI—XVI of Figure 15, and showing the same type of stabilizer that is illustrated in Figure 8;

Figure 17 represents the rear and front end views of a motor vehicle, and illustrates the type of stabilizing arrangement shown in Figure 9;

Figure 18 is a fragmentary view showing the connection between the adjustable stabilizing arm and a bracket carried by the unsprung mass of the vehicle;

Figure 19 is a diagrammatic view of the sinusoidal manner in which a rail vehicle longitudinally moves along the track;

Figure 20 is a view of curves showing the sinusoidal lateral movements of the unsprung mass of a rail vehicle moving longitudinally along the rails, the Figure 20 being shown in the same time relation as Figure 19, the dotted vertical lines showing the corresponding positions.

Figure 21 illustrates the damped lateral oscillations of the unsprung mass of a rail vehicle without my stabilizer and with the rail vehicle running below its "critical speed;"

Figure 22 represents the damped lateral oscillation of the unsprung mass of a rail vehicle provided with my stabilizer and running below the "critical speed;"

Figure 23 illustrates the undamped and sustained lateral oscillations of the unsprung mass of a rail vehicle without my stabilizer and with the rail vehicle running above the "critical speed;"

Figure 24 illustrates the damped lateral oscillations of the unsprung mass of a rail vehicle provided with my stabilizer and running above the "critical speed;"

Figure 25 illustrates the lateral oscillations of the unsprung mass of a locomotive provided with my stabilizer and running above the "critical speed;" in which the amplitudes of the lateral oscillations are not totally damped, but are stable at some predetermined low value.

Figure 1:
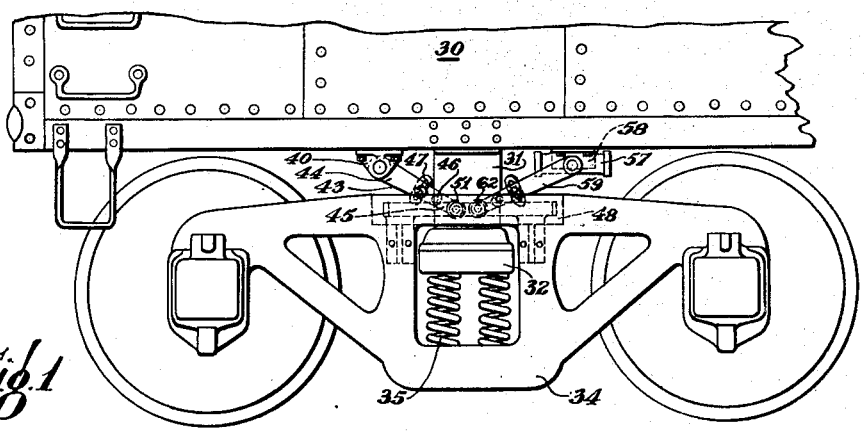
Figure 1 is a partial side elevational view of a rail vehicle, showing only one of the several trucks upon which my invention is embodied.
Figure 2:
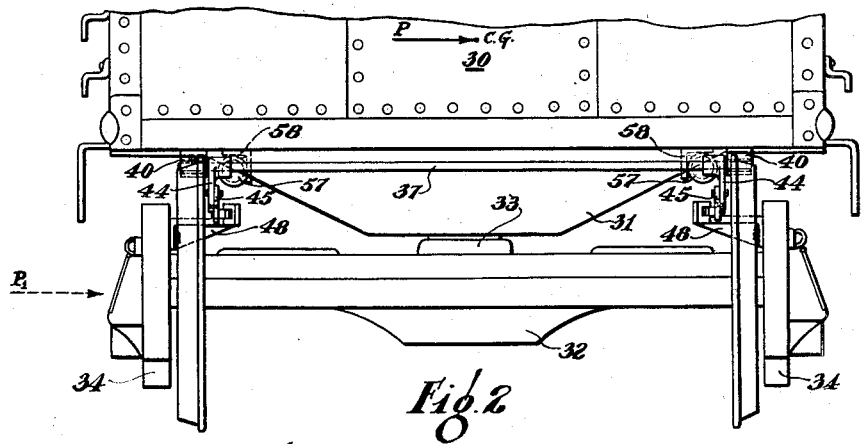
Figure 2 is a cross-sectional and elevational end view of a rail vehicle embodying the features of my invention.

With particular reference to Figures 1 and 2 of the drawings which show a fragmentary view of a freight or passenger car, the unsprung mass comprises in general the body 30, the underframe 31, and the bolster 32 upon which the underframe 31 is pivotally mounted by means of a suitable king plate 33. The unsprung mass of the vehicle comprises in general the wheels and the axles 20 and the truck frame 34 on which the bolster 32 is resiliently mounted by means of the coil supporting springs 35. In accordance with my invention a stabilizing member is mounted between the sprung and the unsprung mass of the vehicle.

The stabilizing member comprises in general a transverse torque member 37 having each of its ends rotatively mounted in rubber-cushioned bearings 40, two adjustable stabilizing arms 43, and a bracket 48 having a longitudinal opening 50 for movably connecting the end of each of the adjustable stabilizing arms to the truck frame 34.

Figure 6:
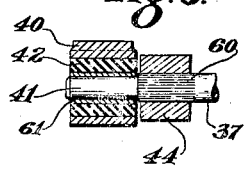
Figure 6 is a fragmentary and cross-sectional view showing the construction of one end of the transverse stabilizing member and the rubber-cushioned bearing in which it is mounted.

With reference to Figure 6, each end of the transverse torque member 37 is provided with a reduced bearing portion 41 which rotatively engages a bearing sleeve 61 resiliently mounted within the bearing bracket 40 by means of a rubber cushion 42. The rubber-cushioned bearings 40 reduce any rattle that may occur to a minimum, and at the same time provides a resilient mounting for each end of the transverse torque member 37.

That portion of the transverse torque member 37 adjacent the rubber-cushioned bearing 40 is splined as at 60 for non-rotatively engaging the adjustable stabilizing arms 43 which comprise two relatively movable parts 44 and 45. As illustrated best in Figure 1 the upper part 44 and the lower part 45 are pivotally joined together by means of a connecting bolt 46 so that the two parts may be movably adjusted relative to each other. To secure rigidly the two parts 44 and 45 together, the upper end of the lower part 45 is provided with a transverse elongated opening 47 through which extends a suitable bolt carried by the upper arm 44. Also, while not shown, the engaging surfaces of the upper arm 44 and the lower arm 45 at places near the transverse elongated opening 47 are provided with complementary notches so that when the nuts of the connecting bolts are securely turned down the two parts of the stabilizing arms 44 are rigidly secured together. Therefore, when making adjustments in the stabilizing arm 44 it is only necessary to unloosen the nuts of the connecting bolts and shift the notchings of the engaging surfaces after which the nuts may be tightened to connect rigidly the two parts 44 and 45. The purpose of the adjustable stabilizing arms 44 is to make it possible when installing the stabilizing member between the sprung mass and the unsprung mass of the vehicle to relieve the transverse torque member 37 of any undue strain when the sprung mass is occupying its normal tilted position upon the unsprung mass. In other words, by reason of the inequality of the lengths of the supporting springs 35 the one side of the body of the vehicle may be normally lower than the other side so that when installing the stabilizing member in the absence of the adjustable stabilizing arms the transverse torque member 37 would be subjected to a continual straining action in the normal tilted position of the sprung mass upon the unsprung mass.

Figure 3:
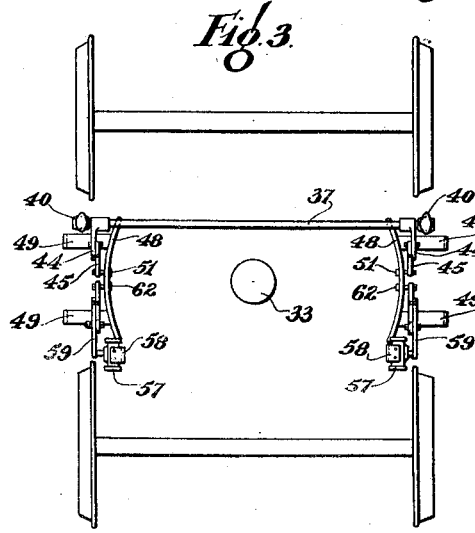
Figure 3 represents a somewhat diagrammatic view of the manner in which my stabilizing member and shock absorbers are connected between the sprung mass and the unsprung mass of a vehicle wherein the unsprung mass may assume various pivotal turning positions with respect to the sprung mass.
Figure 4:
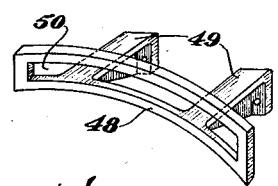
Figure 4 is a prospective view of one of the brackets carried by the opposite sides of the truck frame.
Figure 5:
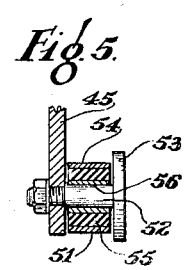
Figure 5 is a fragmentary and cross-sectional view of the rubber-cushioned roller adapted to connect each end of the stabilizing arms to the bracket shown in Figure 4.

The lower end of each of the stabilizing arms 43 is connected to each of the brackets 48 by means of a rubber-cushioned roller 51. The rubber-cushioned roller 51 comprises an inner bearing sleeve 56 adapted to rotate about the stud 52 and an outer bearing sleeve 54 adapted to rotate against either side of the opening 50 of the bracket 48. The rubber 53 is disposed between the two concentric sleeves 54 and 56 to relieve the stabilizing arms from any undue shock, as well as to prevent any unnecessary rattle. As illustrated, the stud 52 is provided with an enlarged flange 53 for preventing the rubber-cushioned roller 51 from becoming disengaged from the longitudinal opening 50 of the bracket 48. The width of the longitudinal opening 50 is slightly larger than the diameter of the rubber-cushioned roller 51 so that the roller is free to rotate against either side of the opening 50 without having one side of the rubber-cushioned roller 51 sliding against the opposite side of the longitudinal opening 50. As illustrated best in Figure 3, the bracket 48 is curved so that for any pivotal position of the unsprung mass relative to the sprung mass, the stabilizing arms 43 are substantially tangent at all times to the curved bracket 48. By this arrangement the unsprung mass may assume various pivotal turning positions with respect to the sprung mass without any interference from my stabilizer.

Mounted on the opposite sides of the underframe 31 is a set of shock absorbers 51 suitably connected to the body 30 by means of a bracket 58. The arms 59 of the shock absorbers are similar in construction to the adjustable stabilizing arms 43 and each have at their lower end a rubber-cushioned roller 51 that is connected to the lower end of the stabilizing arms 43. In this manner the shock absorbers in no way interfere with the pivotal turning of the unsprung mass relative to the sprung mass.

The shock absorbers 57 may be of the type shown in the enlarged view of Figure 10 and may be of the double acting type which resists both the up and down movements of the sprung mass relative to the unsprung mass. As illustrated somewhat diagrammatically in Figure 10 the shock absorbers 57 comprise a relatively long cylinder having a foreshortened piston 86. The piston is actuated by means of the rock shaft 71 and an actuating lug 89 depending from the rock shaft and engaging a suitable recess within the piston 86. Upon the reciprocation of the piston 86 the fluid of the shock absorber is transferred from one chamber to the other through a system of ducts and valves not shown as found in the shock absorbers utilized today for vehicles.

In explaining the operation of my invention let it first be assumed that the relative movements between the sprung and unsprung masses of the vehicle are vertically up and down. Under this condition the two shock absorbers 57 resist both the up and down movements of the sprung mass relative to the unsprung mass. As for my stabilizer, the two stabilizing arms 43 move up and down together and merely rotate the transverse torque member 37 within the rubber-cushioned bearings 40. Consequently, the transverse torque member 37 offers no resistance to the pure vertical movements of the sprung mass relative to the unsprung mass. However, let it be assumed now that the sprung mass tends to "roll" or turn in a clockwise direction relative to the unsprung mass as viewed in Figure 2. Under this condition the two shock absorbers 57 resist such "rolling" action with substantially the same force as they resisted the pure vertical movements of the sprung mass relative to the unsprung mass. However, as is apparent, the "rolling" of the sprung mass relative to the unsprung mass in a clockwise direction causes the upper end of the stabilizing arm on the right hand side of the vehicle where it is connected to the transverse torque member 37 to move upwardly with the result that the transverse torque member 37 is subjected to a twisting action which opposes the "rolling" action of the sprung mass relative to the unsprung mass. The degree of stiffness or rigidity of the transverse torque member 37 may be designed to accommodate vehicles of various capacities by changing the dimensions of the transverse torque member 37 and the distance between the two spaced stabilizing arms 43. When the "rolling" movements of the sprung mass relative to the unsprung mass are in a counterclockwise direction the same twisting action, but in a reverse direction takes place in the transverse torque member 37.

Explaining further, my stabilizer functions to constrain the body 30 to move vertically up and down in a plane parallel to the axles of the truck to which the stabilizer is connected. This means that the floor of the body of the vehicle is not allowed to oscillate or "roll" relative to the plane of travel of the axle, as it does on existing rail vehicles in the absence of my stabilizer, but, on the contrary, is forced to move or travel in a plane that is substantially parallel to the plane of travel of the axle, that is to the plane of the rails at the point where the wheels are contacting. For this reason, it is preferable to have only one of the trucks connected to the body of the vehicle by my stabilizer. If two or more trucks were connected to the body of the vehicle by my stabilizer, assuming, however, that the action of my stabilizer is perfectly rigid, all of the wheels of the vehicle would be rigidly held in a plane parallel to the floor of the body, and in the case of uneven track, the wheels would not be free to move vertically up and down and follow the unevenness of the rails. When two or more trucks are connected to the body of the vehicle by my stabilizer, the stabilizers are designed to give a certain amount of flexure which allows the wheels to move vertically up and down and follows the unevenness of the rails. However, by connecting only one of the trucks to the body of the vehicle by my stabilizer, all of the wheels are free to move vertically up and down and follow the unevenness of the rails. In actual practice, the effect of my stabilizer is to change the four point suspension of the body upon the trucks to a three point suspension. That is to say, the floor of the body of the vehicle is forced to move or travel in accordance with the truck to which my stabilizer is connected. This restraining action produces an effect that is comparable to the action of the two point suspension of the rear end of a three-wheeled vehicle, and the other end of the floor of the body at the point where it is connected to the truck having no stabilizer is merely raised up and down because the travel of the plane of the body is determined by the truck to which my stabilizer is connected. This up and down movement of the body at the point where it is connected to the truck having no stabilizer is comparable to the one point suspension of the front end of a three-wheeled vehicle. This three point suspension effect improves the tracking characteristic of rail vehicles and thus minimizes the lateral force upon the rails.

Besides improving the tracking characteristics, my stabilizer reduces the damage done to live stock, prepared meats, fruits and other goods in transit. Usually, in the transportation of prepared meats, a shoulder or other bulk is hung or suspended on hooks from the roof of the car, and, when once the car begins to "roll," the undamped action grows to large and dangerous proportions even to the extent that in some cases a majority of the meat is thrown from the hooks to the floor.

In addition to my stabilizer arresting the "rolling" action of the sprung mass relative to the unsprung mass, it provides indirectly a second function, in that it keeps the truck from needlessly turning under the body. In other words, the angle between the center line of the rail vehicle and the center line of the truck is reduced to a minimum. Consequently, there is no tendency for the wheels to run laterally from one side of the track to the other. This second stabilizing feature results indirectly from the fact that the magnitude of the lateral forces which tend to cause the truck to turn under the body has been materially reduced by the prevention of the "rolling" action of the sprung mass relative to the unsprung mass. Therefore, any reduction in the magnitude of the lateral forces likewise causes the angularity between the center line of the rail vehicle and the center line of the track to be reduced substantially to zero.

Summarizing, it is noted from the foregoing that my stabilizer allows the sprung and the unsprung masses to move vertically up and down, but resists any movement that tends to cause the sprung mass to "roll" with reference to the unsprung mass, and, in addition, tends to stabilize the truck from needlessly running from one side of the rails to the other.

In considering the tracking characteristics of a rail vehicle, let us assume first that the rail vehicle is moving along a straight and level track, in an undeviated path. If some transient disturbance, such, for example, as a crooked place in the track, causes the center line of the rail vehicle to assume an angular position relative to the center line of the track, the rail vehicle will travel in the direction of its own center line. The angular position of the center line of the rail vehicle relative to the center line of the track, together with the forward (or backward) longitudinal movement of the rail vehicle, causes the rail vehicle to run across the track until the flanges of the leading wheels strike the rail. The impact of the flanges striking the rail turns the rail vehicle and thus causes the rail vehicle to run back to the other side of the track. This lateral motion of the wheels running from one side across to the other is called "nosing" of the unsprung mass of a rail vehicle. This "nosing" action comprises essentially two movements:

(1) A rotational movement about a vertical or polar axis through some point in the center line of a rail vehicle, thus causing the center line of the rail vehicle to assume a variable angle with respect to the center line of the track.

(2) A lateral movement of the polar axis about which the rotation takes place, being caused by the rail vehicle moving forwardly or backwardly with its center line at a variable angle relative to the center line of the track.

Therefore, from the foregoing it is observed that if the center line of the rail vehicle is not allowed to assume an angular position with respect to the center line of the track, the undesirable "nosing" action cannot exist. As heretofore pointed out, my stabilizer functions to prevent the center line of the rail vehicle from assuming an angular position relative to the center line of the track.

The "nosing" action may best be understood by referring to Figures 19 and 20, which are illustrative of the path taken by a rail vehicle in describing a substantially sinusoidal path in a cycle of longitudinal motion.

In position A the rail vehicle is shown having reached its maximum angularity about the polar axis O. In this position the displacement of the point X caused by the angularity is maximum. The point X would normally lie on the center line of the track if there were no displacement caused by the "nosing" action. It is to be noted that the wheels $W_1$, $W_2$, $W_3$ and $W_4$ designed by the four corners of the rectangularly illustrated vehicle have the same general movements as the point X, the wheels $W_3$ and $W_4$, of course, being negative with respect to the center line of the track as compared with the wheels $W_1$ and $W_2$ which are positioned positively with respect to the center line of the track. The flange of the wheel $W_1$ in the position A does not touch the rail as there has been only a rotational movement about the polar axis O. The lateral displacement of the polar axis O at this position is zero.

The vehicle proceeds to position B. During this interval of time the angularity about the polar axis O decreases slightly, but the polar axis O does itself depart from the center line of the track because of the tendency of the vehicle to travel laterally in the direction of its own center line. The resultant displacement of the point X in position B has increased because the lateral displacement of O was more than the decrease in the angularity displacement of X. This is shown clearly by the curves of Figure 20 wherein it is noted that the resultant lateral displacement of X is greater at position B than at position A. The flange of the wheel $W_1$ in position B is on the verge of striking the rail but will not do so until the polar axis O of the vehicle reaches the line $B_1$, at which point the resultant lateral displacement of X is a maximum. See Figure 20.

Proceeding to position C the flange of the wheel $W_1$ having struck the rail, the vehicle straightens out and assumes a position such that its center line lies parallel to the center line of the track, making the angularity about the polar axis O zero. The lateral displacement of the polar axis O is at its maximum, (see Figure 20) but it is to be noted that the wheels $W_1$ and $W_3$ do not bear against the rail, there being a small clearance. At this position the resultant lateral displacement curve for X coincides with the lateral displacement curve for O.

In the position D the rail vehicle has deflected from its previous parallel position as at C and assumes a slightly negative angle with respect to the center line of the track. During the interval between positions C and D the lateral displacement of the polar axis O decreases resulting from the longitudinal motion of the vehicle and from its tendency to travel in the direction of its own center line. The resultant displacement of the point X or the wheels $W_1$ and $W_2$ is almost zero, reaching zero, however, when the polar axis O of the vehicle reaches the line $D_1$, where the positive amplitude of the lateral displacement of O just equals the negative amplitude of the angularity displacement of X. See Figure 20.

In position E the polar axis O lies on the center line of the track while the angularity about the polar axis has reached its maximum negative value. The resulting lateral displacement of the wheels $W_1$ and $W_2$ is at a value equal to that of the angularity displacement of X alone.

In approaching position F the angularity about the polar axis decreases while the polar axis itself moves in a negative direction with respect to the center line of the track. In position F the flange of the wheel $W_2$ is almost ready to strike the rail, but will not do so until the polar axis O of the vehicle reaches the line $F_1$.

In position G the vehicle assumes a parallel position with respect to the track, being similar to the position C except that the vehicle has proceeded laterally to the opposite side of the track and its center line in a negative position with respect to the center line of the track.

In position H the vehicle assumes a position similar to that of position D except that the displacement values are just the opposite. The resultant displacement of the point X or the wheels $W_1$ and $W_2$ in position H is almost zero, reaching zero, however, when the polar axis O of the vehicle reaches the line $H_1$. See Figure 20.

The cycle is completed in position J where the vehicle is in an analogous position to that of position A.

From the curves of Figure 20 it may be seen that the angularity displacement of X or the lateral motion of the wheels resulting from the rotation about the polar axis O is 90° out of phase with the lateral displacement of O resulting from the lateral motion of the center of rotation.

As the vehicle proceeds longitudinally along the track this cycle is indefinitely repeated. Therefore, to describe the lateral motion of any point on the center line of the rail vehicle the motion resulting from the rotation of the angularity must be added vectorially to the lateral displacement of the polar axis O. It should be noted with reference to Figure 20 that the amplitudes of the curves are not a measure of the magnitude of the lateral and angular displacements but only show the direction.

Inasmuch as the weight of the sprung mass is much heavier than the unsprung mass of a rail vehicle and, inasmuch as the stiffness of the rails is large compared to the stiffness of the springs that support the sprung mass on the rail vehicle the natural frequency of the rail vehicle is determined primarily by the combination of the sprung mass and the elasticity of the springs that support the sprung mass. Therefore, the frequency of the rail vehicle is substantially independent of the speed, which means that the angularity about the polar axis O varies inversely as the speed. In other words, as the speed of the vehicle increases the angularity about the polar axis decreases. Therefore, for very high speeds the resultant lateral displacement of X consists mostly of lateral displacement with very little angularity displacement.

The frictional force F, see Figure 20, which causes the phenomena of "nosing" is the frictional force between the treads of the wheels and the rails which cause the rail vehicle to travel in the direction of its own center line rather than in the direction of the center line of the track. The maximum value of the disturbing force is the weight of the vehicle times the coefficient of friction between the treads of the wheels and the rails. The existence of this disturbing force is determined by the motion itself. Therefore, the frequency of the disturbing force and the motion are always equal. In other words, if there is some natural frequency at which the rail vehicle tends to oscillate the natural frequency of the disturbing force will always be in resonance.

As hereinbefore discussed, by reason of the angularity between the center line of the rail vehicle and the center line of the track, the wheels run from one rail towards the other and back again. The lateral oscillations of the unsprung mass causes a corresponding lateral oscillation to be imparted to the sprung mass of the rail vehicle. However, by virtue of the spring that support the sprung mass the lateral oscillations of the sprung mass take the form of a "rolling" action. That is to say, the sprung mass is displaced laterally while at the same time the springs on one side of the rail vehicle are expanded upwardly and the springs on the other side of the rail vehicle are deflected downwardly. The total inertia force P caused by the lateral accelerations of the sprung mass may be considered as applied at the center of gravity, see Figure 2. The inertia force P applied at the center of gravity may be replaced by the lateral force P' of equal magnitude applied at the axle or journal boxes and two equal and opposite vertical forces applied at the coil supporting springs 35 of the rail vehicle. It is noted that the two equal and opposite vertical forces tend to rotate the sprung mass about the center of gravity. This rotational motion may be characterized as a "rolling" action. The lateral force P' is in phase with the lateral velocity of the unsprung mass and hence increases the lateral motion of the unsprung mass. Then an increase of this motion causes a corresponding increase in the frictional disturbing force F which in turn causes an increase in the "rolling" action of the sprung mass and the accompanying increase in the inertia force P. This circuitous oscillatory action unless impeded by a resisting force continues to build up to dangerous proportions which in case of high speeds becomes great enough to cause a lateral force P' to spread the rails and thus cause derailment and wrecks.

From the foregoing discussion it is noted that the phenomenon of "nosing" may be characterized as "self-induced" vibrations; that is to say, the disturbing force F furnishing the energy to the vibration is controlled by the motion itself, in contradistinction to "forced" vibrations where the disturbing force is independent of the motion.

Since there is motion set up in the elastic system of a rail vehicle there must be an energy input causing such motion. The energy input is dependent upon the wheel treading, the number of axles, the co-efficient of friction between the wheels and track, the clearance, the frequency, the length of the vehicle, and the speed.

The energy losses which tend to minimize the "nosing" action are mostly caused by the angularity displacement or the transverse sliding of the wheels upon the rails as the rail vehicle oscillates about its polar axis. The weight of the vehicle, the co-efficient of friction between the wheels and the track, the clearance, the frequency, the length of the rail vehicle and the speed are also functions of the energy losses in the elastic system of a rail vehicle. The point where the energy input equals the energy losses is the "critical" speed of the rail vehicle. For speeds below the "critical" speed, the frictional losses of the unsprung mass of the rail vehicle is greater than the energy input of the unsprung mass of the rail vehicle. Consequently, for speeds below the "critical" speed, any lateral oscillations of the unsprung mass that start are quickly damped out. For speeds above the "critical" speed the reverse condition is true, and thus energy is available to sustain the lateral oscillations of the unsprung mass of the rail vehicle.

However, by mounting my stabilzer between the sprung mass and the unsprung mass of the rail vehicle there is substantially no energy available to sustain the oscillation of the unsprung mass of the rail vehicle for the reason that the magnitude of the lateral force P applied at the center of gravity of the sprung mass is reduced to a very low value. The reduction of the magnitude of the lateral force P causes a corresponding reduction in the lateral force P' applied to the axles or the journal boxes of the unsprung mass, with the result that the angularity between the center line of the rail vehicle and the center line of the track is under all speeds of the rail vehicle reduced substantially to zero. Therefore, in view of the fact that the angularity is reduced substantially to zero my stabilizer prevents the "nosing" action and the "rolling" action of the rail vehicle for all speeds.

In Figures 21 to 25 inclusive, I illustrate the lateral oscillations of the unsprung mass of a rail vehicle with and without my stabilizer. In all of these cases, the track is presumed to be straight and the magnitudes $$\frac{C}{2}$$

of the first lateral oscillation are the same.

Figure 21 represents the lateral oscillations of the unsprung mass of a rail vehicle without my stabilizer and with the rail vehicle running below its "critical speed". This lateral oscillation becomes damped, for the reason that the frictional losses of the unsprung mass of the rail vehicle are greater than the energy input of the unsprung mass.

Figure 22 represents the same condition as Figure 21, except that the rail vehicle is provided with my stabilizer. In this case, the lateral oscillations are damped somewhat quicker, since my stabilizer adds to the damping action caused by the frictional losses of the unsprung mass of the rail vehicle.

The lateral oscillation represented by the curve in Figure 23 is for a rail vehicle provided with no stabilizer and with the rail vehicle running above the "critical speed." In this case, energy is available to sustain the lateral oscillation of the unsprung mass, and as a result the amplitude builds up to large proportions, thus causing correspondingly large lateral forces on the rails.

Figure 24 represents the same condition as Figure 23, except that the rail vehicle is provided with my stabilizer. In illustrating this case, I have assumed that the arresting action of my stabilizer is sufficiently large to totally damp the lateral oscillations of the unsprung mass of the rail vehicle.

Figure 25 represents the same condition as Figure 24, except in illustrating this figure I have assumed that the arresting force of my stabilizer is not quite sufficiently large to totally damp out the lateral oscillations of the unsprung mass of the rail vehicle. In this case, the amplitude of the lateral oscillations is readily damped down to a low value, at which point the oscillations become stable.

Summarizing, it is noted that there are two disturbing factors which cause a rail vehicle to "nose"; one the rolling of the sprung mass with respect to the unsprung mass, and second the angle that exists between the center line of the rail vehicle and the center line of the track. As hereinbefore pointed out, the action of my stabilizer is two-fold, in that it reduces the value of both of these disturbing factors to a minimum.

In Figure 7 I illustrate a modified arrangement of my invention in that the shock absorbers 57 and my stabilizer are combined into a unitary structure. In Figure 7, the brackets 48, the lower ends 45 of the stabilizing arms, and the rubber-cushioned rollers 51 are of the same construction as heretofore described with reference to the Figures 1 to 6 inclusive. In this modified arrangement the shock absorbers 57 are interconnected by means of two couplings and a transverse torque member 74. As illustrated in Figure 10, each of the two couplings comprise a primary coupling arm 72 and a secondary coupling arm 73 connected together by means of a through bolt 75 which extends through registered openings provided in both the primary arm 72 and the secondary arm 73. Disposed around the through bolt 75 and the registered openings is a concentric layer of rubber 76, which absorbs the shock between the primary coupling arm 72 and the secondary coupling arm 73. Also, a sleeve 78 is disposed around the through bolt 75 and between the primary coupling arm 72 and the secondary coupling arm 73.

As illustrated, the secondary coupling arm 73 is non-rotatively engaged to the rock shaft 71 of the shock absorbers, and the primary coupling arm 72 is non-rotatively engaged to each end of the transverse torque member 74. Also, the primary coupling arm 72 is adjustably connected to the lower end of the arm 45. This adjustable connection is the same as the adjustable connection as shown or described in Figure 1. In explaining the operation of my invention as illustrated in Figure 7, let it first be assumed that the relative movements between the sprung and the unsprung masses of the vehicle are vertically up and down. Under this condition the primary coupling arm 72, and the lower arms 45 which engage the longitudinal opening 50 of the bracket 48 move up and down together with the result that the shock absorbers 57 operate in their normal manner to resist both the up and down movements of the sprung mass relative to the unsprung mass, while at the same time the arms merely rotate the transverse torque member 74. This means that under this condition the transverse torque member 74 offers no resistance to the pure vertical movements of the sprung mass relative to the unsprung mass of the vehicle.

However, let it be assumed now that the sprung mass tends to "roll" or turn in a clockwise direction. Under this assumed condition the shock absorbers resist such "rolling" action with substantially the same force as they resist the pure vertical movements of the sprung mass relative to the unsprung mass. However, as is apparent, the "rolling" of the sprung mass relative to the unsprung mass in a clockwise direction causes the upper end of the primary coupling arm 72 on the right hand side of the vehicle where it is connected to the transverse torque member 74, as viewed in Figure 7, to move downwardly and cause the upper end of the primary coupling arm 72 on the left hand side of the vehicle where it is connected to the transverse torque member 37 to move upwardly, with the result that the transverse torque member 74 is subjected to a twisting action which opposes the "rolling" action of the sprung mass relative to the unsprung mass. The degree of stiffness or rigidity of the transverse torque member 74 may be designed to accommodate vehicles of various capacities by changing the dimensions of the transverse torque member 74 and the distance between the two spaced primary coupling arms 72. When the "rolling" movements of the sprung mass relative to the unsprung mass are in a counter-clockwise direction the same twisting action but in a reverse direction takes place in the transverse torque member 74.

In combining the joint action of my stabilizer and the shock absorbers as shown and described with reference to Figure 7 the entire construction may be made with a fewer number of parts inasmuch as the lower arm 45 actuates both the shock absorbers and the transverse torque member 74. In this modified form, as well as in the construction previously described with reference to Figures 1 to 6 inclusive, the combined action of the shock absorbers and my stabilizer interferes in no manner with the pivotal turning of the unsprung mass relative to the sprung mass. It has been noted that the transverse torque member 37 as shown with respect to Figures 7 and 10 function to resist the "rolling" movement of the sprung mass relative to the unsprung mass. This resisting force is accomplished by twisting the transverse torque member. The action of the transverse torque member is such that during the twisting action energy is stored up and during the untwisting action the energy is released. In other words, when the transverse torque member releases the energy it tends to cause the sprung mass to "roll" in the opposite direction beyond the normal position of the sprung mass, thus producing a damped oscillation of the "rolling" movement of the sprung mass relative to the unsprung mass. This is because the transverse torque member does not absorb and dissipate the energy but only stores up energy and releases the energy. Inasmuch as the entire vehicle may be considered as an elastic system the introduction of a transverse torque member may in some cases cause undesirable vibrating disturbances in some other part of the elastic system. Therefore, to obviate any undesirable condition that may arise I provide for absorbing and dissipating the energy that tends to cause a "rolling" movement between the sprung mass and the unsprung mass. As shown in Figure 8 this absorption and dissipation of the "roll" energy may be attained by connecting a third shock absorber 91 between the two shock absorbers 57. As illustrated, the body of the third shock absorber 91 is bolted or otherwise secured to the arm 92 which actuates the rock shaft of the shock absorbers 57 mounted on the right hand side of the vehicle. The rock shaft of the third shock absorber 91 is connected to a transverse torque member 95 by means of a coupling having two coupling arms 93 and 94. The construction of the shock absorbers 57 and the coupling on the left hand side of the vehicle is the same as that previously described in connection with Figure 7.

The introduction of the third shock absorber 91 between the two shock absorbers 57 provides for absorbing and dissipating the energy that tends to cause the sprung mass to "roll" relative to the unsprung mass. The third shock absorber 91 may be a double-acting type having a construction similar to the shock absorber illustrated in Figure 10. Therefore, the third shock absorber 91, since it absorbs and dissipates the "rolling" energy, prevents any undesirable disturbances in the elastic system of the vehicle which might otherwise occur by utilizing a transverse torque member which merely stores up the "rolling" energy, and which subsequently releases it. The resistance that the third shock absorber 91 offers to the "rolling" movement may be regulated by an adjustment somewhat in the same fashion as in the existing shock absorbers to give varying resistance to the movement of the sprung mass relative to the unsprung mass. In Figure 8 the truck of the vehicle is shown in a turning position, which illustrates the manner that the lower arm 45 may move relative to the bracket 48 when going around a curve. It is noted that by utilizing the third shock absorber 91 the action is such that the shock absorber resists the sudden changes in the "rolling" movements of the sprung mass relative to the unsprung mass and does not tend to maintain the sprung mass substantially parallel to the unsprung mass. Therefore, in order to make it possible to maintain the sprung mass substantially parallel to the unsprung mass at all times, and at the same time causing an absorption of the "rolling" energy I provide for resiliently connecting the coupling arm 93 to the body of the shock absorber 91. This modification is shown in Figures 9, 11 and 12. To this end, there is securely connected to the coupling arm 93 a yoke member 96 between which the free end of the spring member 98 is mounted. The stationary end of the spring member 98 is connected by means of a bracket 97 to the body of the third shock absorber 91. In operation, this construction puts a resilient member in parallel with an absorption member. Therefore, the third shock absorber 91 absorbs the "rolling" energy and the spring member 98 tends to maintain the sprung mass at all times substantially parallel to the unsprung mass.

In Figures 13 and 14 I replace the third shock absorber 91, which is of the fluid type, by a shock absorber 99 constructed of a plurality of assembled rubber blocks 102 enclosed within a casing. Within the casing there is a stationary stop 100 and a swinging arm 101 which is actuated when any "rolling" movement takes place between the sprung mass and the unsprung mass. The swinging of the arm in either direction compresses the rubber blocks 102 to resist the "rolling" action of the sprung mass relative to the unsprung mass. This compressing of the rubber causes a certain absorption of energy resulting from the hysteresis loss occurring within the rubber. In both Figures 8 and 9 the transverse torque member 95 may be relatively stiff so that the large part of the relative movement is taken up by the third shock absorber 91 or the rubber shock absorber 99. In Figure 9 the truck of the vehicle is shown in a turning position opposite from that shown in Figure 8.

In Figures 15 and 16 I show how my stabilizer may be mounted between the main frame (sprung mass) and the journal boxes (unsprung mass) of an electric locomotive having a spring equalization system. Briefly, the purpose of the spring equalization system is, in the case of an even track, to distribute equally the weight of the sprung mass upon the wheels, and thereby ensure substantially uniform traction between each driving wheel and the rails. As will appear later in the description, the action of my stabilizer is such that it does not materially interfere with the spring equalization system.

In the following description of my stabilizer respecting the electric locomotive, like parts of my invention are designated by the same reference characters as those used in connection with the freight or passenger car of Figures 1 to 14 inclusive.

For this showing of my invention I connect my stabilizer between the main frame and the journal boxes of the two rear axles of the front half of the electric locomotive. To this end each of the shock absorbers 57 are connected to a longitudinal supporting member 111 that interconnects the pedestals 124 which rest upon the journal boxes of the two rearward axles. The showing of the stabilizer as mounted upon the electric locomotive in Figures 15 and 16 is the same construction as that shown with reference to Figure 8 in that there is a third shock absorber 91 between the two shock absorbers 57. The end of the arm 45 is connected by means of a connecting rod 114 to a suitable bracket 113 carried by the frame of the electric locomotive, an enlarged view of which is shown in Figure 18. It is noted that there are disposed two rubber-cushioned blocks 119 on opposite sides of the bracket so that by turning the nuts 120 the two rubber-cushioned blocks 119 are compressed closely against the bracket. This connection allows a certain degree of freedom of the connecting rod 114 to allow the upper end of the connecting rod 114 to swing slightly as the sprung mass moves relative to the unsprung mass.

My stabilizer may with equal propriety be applied to street cars, where it is necessary for them to go around sharp street corners. Also, by a similar mounting, my stabilizer may be mounted between the journal bearings and the main frame of a steam locomotive. For simplicity and clarity, the electric motors and the gearing interconnecting the motors and the axles, are not shown.

The operation of my stabilizer in connection with the electric locomotive is the same as that explained in connection with the freight or passenger car of Figures 1 to 14 inclusive. Briefly, the main frame and in turn the body is forced by means of my stabilizer to move vertically up and down with respect to the place of the rails at the place where the four rearward wheels contact the rails. This action, however, does not in any material manner interfere with the spring equalization system, because, in all cases regardless of the unevenness of the tracks, the four rearward wheels of the front half of the locomotive are allowed to move up and down and follow the unevenness of the rails.

As the four rearward wheels of the front half of the locomotive follow the unevenness of the rails, they, in turn, through my stabilizer, cause the main frame and the body to travel in a plane that is substantially parallel to the average plane of travel of the four rearward wheels.

The single stabilizing connection, as shown in Figures 15 and 16 takes care of the entire locomotive, and, accordingly, the forward wheels of the front half of the locomotive and all of the wheels of the rear half of the locomotive function, in all respects, as they function on existing rail vehicles in the absence of my invention.

Therefore, by utilizing the provision of my invention to arrest the rolling action of the sprung mass of a locomotive, the possibility of the rails spreading, and thus causing injury to passengers and damage to the rolling stock, is totally avoided, even at speeds greatly in excess of 100 miles an hour or more. Another beneficial result is that the maintenance of the rails and the road bed is materially reduced. When high speed locomotives are allowed to exert high lateral forces on the rails resulting from an undamped "nosing" action, the rails, after they are used a short period, become warped, which in turn causes the "nosing" action to become worse. This action is cumulative and in some cases the track, if not properly maintained, becomes excessively crooked, taking the form of a substantially sinusoidal path. This is greatly avoided by the action of my stabilizer, which keeps the lateral forces of the unsprung mass of the vehicle to a very low maximum.

The arrangement of my invention wherein a third shock absorber is employed to absorb and dissipate the energy that is normally available to sustain the lateral oscillation of the unsprung mass, is particularly adaptable to a rail vehicle because the third shock absorber is continually absorbing and dissipating the energy, whereas a single transverse torque member merely stores up the energy and releases the energy without effecting any dissipation.

In Figure 17 I show my stabilizer in connection with a motor vehicle having knee-action on the front wheels, which because of the instability and flexibility of the springs 130 and the associated lever arms 131 and 132, allow the front wheels to move up and down relative to the sprung mass. In this embodiment of the invention, my stabilizer is preferably mounted between the rear axle and the frame upon which the body is mounted, and like parts of my invention are designated by like reference characters. Although I have preferably illustrated my stabilizer as being mounted between the rear axle and the frame, I do not intend to limit the scope of my invention to this showing.

The arrangement of my invention as shown in Figure 17 as applied to a motor vehicle is the same as that shown in Figures 9, 11 and 12 of the drawings as previously described with reference to a rail vehicle, and the shock absorbers 57 are connected to the two side frames 121 and 122 of the motor vehicle. The ends of the arms 45 are connected by means of a connecting rod 114 to a bracket 123 carried by the axle or unsprung mass of the motor vehicle. The connecting rod 114 and the manner in which it is connected to the bracket 123 is the same as that previously described, and is shown in Figure 18. It is noted that by reason of the interconnecting spring 98 between the third shock absorbers 91 and the coupling arm 93, the body of the motor vehicle is constrained to be substantially parallel with the rear axle at all times, while at the same time the third shock absorber 91 in addition absorbs and dissipates the energy that normally would cause the sprung mass to "roll" relative to the rear axle.

As hereinbefore explained, my stabilizer in effect, changes the four-point suspension of a motor vehicle to a three-point suspension. Hence, the riding comfort and the traction between the rear wheels and the road surface are greatly improved. This is because my stabilizer forces the entire body of the motor vehicle to travel in a plane that is substantially parallel to the plane of the travel of the rear axle, with the result that the jolts received by the front wheels, caused by uneven places in the road surface, tend only to raise the front end of the body, devoid of any "rolling" action, as the plane of travel of the body is governed solely by plane of travel of the rear axle. In actual practice, the action of the entire body suspension is comparable to that of a three-wheeled motor vehicle, in that the plane of travel of the body is determined by the two-point suspension in the rear end, and the single-point suspension in the front of the motor vehicle tends only to raise the front end of the body.

It is a well known fact that a three-wheeled motor vehicle takes the irregularities of the road surface with less jolting than a four-wheeled motor vehicle. For this reason, my invention improves the riding comfort of a four-wheeled motor vehicle. Furthermore, the jolts received by the front end are readily damped, without transmitting any noticeable jolts to the body, for the reason that the jolts of the front axle must raise the entire front end of the body and not merely "roll" or oscillate the body, as it would do in the absence of my stabilizer. This, in effect, as regard damping the jolts received by the front end makes the front end of the body heavier.

With respect to the rear axle, my stabilizer improves the traction between the tires and the road surface. In other words, the objectionable bouncing and spinning of the rear wheels are practically eliminated, because the excess energy that causes the bouncing and spinning of the rear wheels is transmitted through my stabilizer to the entire body where the energy is readily dissipated in controlling the action and plane of travel of the body.

It is understood that the rail vehicle and the motor vehicle may be equipped with each of the different types of my stabilizer. In all of such arrangements the lower arm 45 is adapted to engage either the connecting rod 114 or the opening 50 of the bracket 48, depending, of course, upon whether it is necessary to have the unsprung mass to move pivotally with respect to the sprung mass.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. In a vehicle having a sprung and an unsprung mass, in combination, connective means carried by both the sprung and the unsprung masses, and resisting means including a readily mountable and removable intermediate shock absorber and cross bar force transmitting means interconnecting the connective means for resisting the relative movements of the sprung and unsprung masses, said resisting means including an adjustable arm having two relatively movable parts, means for connecting the two relatively movable parts together so that the said parts may be adjusted relative to each other.

2. In a vehicle having a sprung mass, a portion of which being supported upon an unsprung mass, and another portion of which being supported upon a plurality of unsprung masses, whereby one or more of the said plurality of unsprung masses is connected to the sprung mass by a combination of resilient means and associated lever arms adapted in such manner that the combined movement of the said resilient means and the said associated lever arms allows one or more of the wheels of the said plurality of unsprung masses to move up-and-down relative to the sprung mass so that the said wheels mounted on the plurality of unsprung masses may pass over irregularities in the road surface, in combination, connection means carried by the sprung mass, connective means carried by the first-mentioned unsprung mass, and stabilizing means including two portions connected together by a readily attachable and detachable energy absorbing device and cross bar force transmitting means for interconnecting the said connective means, the arrangement of the stabilizing means and the connective means being such that the said arrangement stabilizes the sprung mass upon the said first-mentioned unsprung mass and thus constrains the sprung mass from "rolling" relative to the said first mentioned unsprung mass, which rolling would otherwise occur in the absence of the stabilizing means and the connective means because of the action of the said combination of the resilient means and the associated lever arms which allows one or more of the wheels of the said plurality of unsprung masses to move up-and-down relative to the sprung mass when the vehicle is passing over irregularities in the road surface.

3. In a vehicle having a sprung and an unsprung mass, in combination, two spaced resisting means for resisting the relative movements of the sprung and unsprung masses, means for connecting the two spaced resisting means between the sprung and unsprung masses, means including an absorbing means for interconnecting the two first-mentioned resisting means to resist the relative "rolling" movements of the sprung and unsprung masses of the vehicle, and resilient means associated in parallel with the said absorbing means to resist further the relative "rolling" movements of the sprung and unsprung masses of the vehicle.

4. In a vehicle having a sprung mass mounted upon an unsprung mass by means of supporting springs in combination, connective means carried by both of the said masses, stabilizing means including two spaced arms connected together by a readily attachable and detachable energy absorbing device and cross bar force transmitting means for interconnecting the connective means to resist the relative "rolling" movements of the said masses, each of said spaced arms being constructed of two adjustable members, and means for adjusting the relative positions of the two adjustable members, so as to take care of any inequality of the supporting springs of the vehicle and thus relieve the stabilizing means of any undue strains.

5. Vehicle chassis construction comprising, a frame supported upon an unsprung mass by springs, said frame including longitudinal members, shock absorbers secured to the longitudinal members having shafts projecting therefrom, actuating arms secured to the shafts and to the unsprung mass to rotate the same, means connecting the two arms together comprising a third shock absorber connected to one of said actuating arms having a shaft projecting therefrom and an actuating element connected thereto, members parallel to the other of said actuating arm and the said actuating element and connected thereto through resilient connections, and a rod securing the members together whereby movement of one actuating arm will be transmitted to the other through means of the third shock absorber.

6. A stabilizer for use in a vehicle construction having a sprung mass with spring suspension upon an unsprung mass and shock absorbers on opposite sides of the sprung mass, of actuating arms on the shock absorbers and connected to the unsprung mass, a third shock absorber connected to one of said actuating arms having a shaft projecting therefrom and an actuating element connected thereto, members paralleling the other of said actuating arm and the said actuating element and secured thereto at spaced points by resilient connections, and a rod secured to an intermediate portion of the members to secure them together through means of the third shock absorber.

7. A stabilizer for use in a vehicle construction having a sprung mass with spring suspension upon an unsprung mass and shock absorbers on opposite sides of the sprung mass, of actuating arms for the shock absorbers connected to the unsprung mass, a third shock absorber connected to one of said actuating arms having a shaft projecting therefrom and an actuating element connected thereto, members paralleling the other of said actuating arm and the said actuating element and connected thereto, and a shaft connecting the members together and rigidly secured to each.

8. A stabilizer for use in a vehicle chassis having a sprung mass with spring suspension upon an unsprung mass comprising, in combination, shock absorbers secured to the sprung mass on opposite sides, operating shafts projecting from the shock absorbers, actuating arms secured to the shafts at a point intermediate the ends, means securing one end of the arms to the unsprung mass, a third shock absorber connected to one of said actuating arms having a shaft projecting therefrom and an actuating element connected thereto, pins projecting from the other of said actuating arm and the said actuating element at spaced points, one on each side of the shaft connection, parallel members spaced from the other of said actuating arm and the said actuating element and connected thereto through the pins and torque conscious means securing the members together.

9. Vehicle chassis construction comprising a vehicle chassis having a sprung mass with spring suspension on an unsprung mass and shock absorbers connected on opposite sides of the sprung mass, means securing one end of the arms to the unsprung mass, operating shafts for the shock absorbers, actuating arms therefor connected to the shafts intermediate their ends, a third shock absorber connected to one of said actuating arms having a shaft projecting therefrom and an actuating element connected thereto, and means whose axis is coincidental with that of the shafts resiliently connected to the other of said actuating arm and the said actuating element at spaced points, one on each side of the shaft connection whereby rotation of one of the actuating arms about its shaft will be transmitted to the other through means of the third shock absorber.

10. Vehicle chassis construction comprising a vehicle chassis having longitudinal side members, a shock absorber mounted on each side member opposite each other, rotatable actuating means for the absorbers, torque conscious means including a third shock absorber in alinement with the axis of the rotatable means and secured at both ends thereto at a plurality of points spaced from the aforesaid axis.

11. Vehicle chassis construction comprising a chassis having longitudinal side members, a shock absorber mounted on each side member in opposite relation, rotatable actuating means therefor, and torque conscious means in alinement with the axis of the rotatable means and resiliently secured at both ends thereto at a plurality of points spaced from the axis, and a third shock absorber mounted for actuation between one of said rotatable actuating means and the torque conscious means.

12. Stabilizer construction in motor cars having two opposite shock absorbers mounted on the frame rear, shafts projecting from the absorbers, actuating arms secured to the shafts intermediate the ends, a third shock absorber connected to one of said actuating arms having a shaft projecting therefrom and an actuating element connected thereto, pins projecting from the other of said actuating arm and the said actuating element at spaced points on opposite sides of the shaft, members parallel with the other of said actuating arm and the said actuating element but spaced therefrom and connected thereto through the pins engaging openings therein, and means connecting the members together whereby movement of one arm will be transmitted to the other through means of the third shock absorber.

GEORGE V. WOODLING.